No. 672,743. Patented Apr. 23, 1901.
A. S. RAMAGE.
PROCESS OF OXIDIZING OILS.
(Application filed Aug. 25, 1900.)
(No Model.)
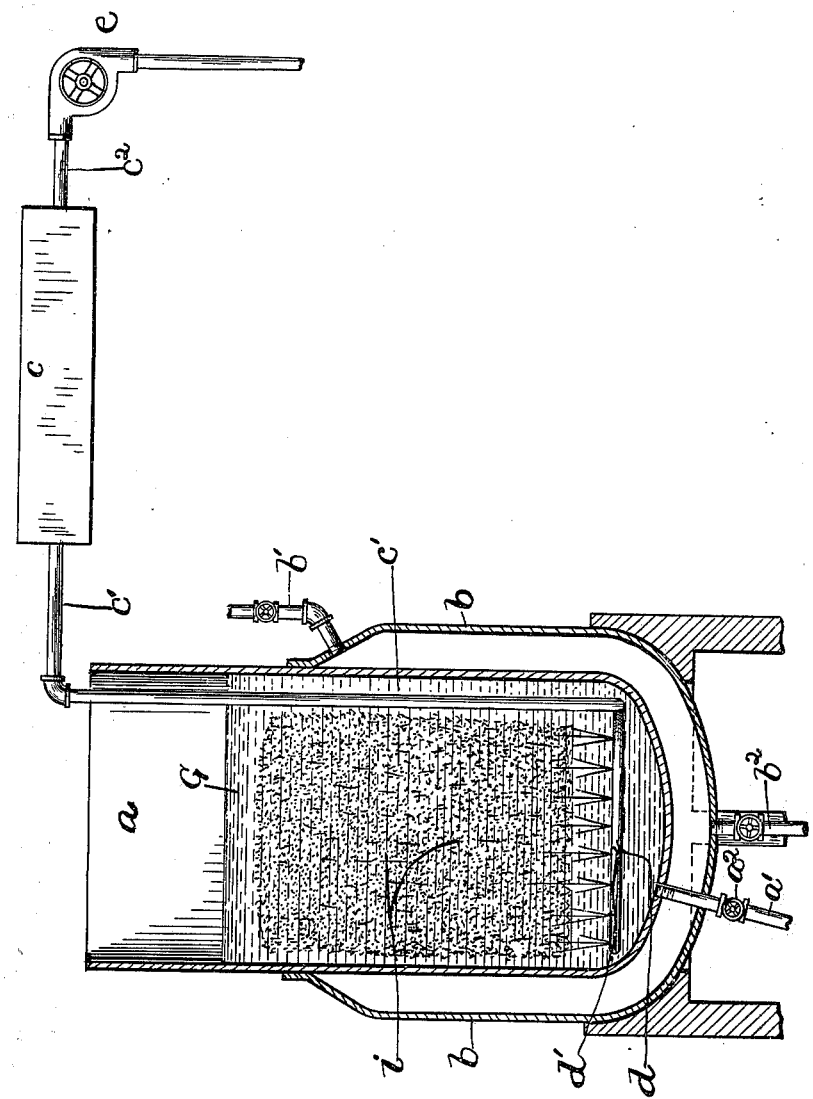
WITNESSES:
Daniel E Daly.
Victor C. Lynch.
INVENTOR
Alexander S. Ramage
BY
his ATTORNEYS

UNITED STATES PATENT OFFICE.

ALEXANDER S. RAMAGE, OF CLEVELAND, OHIO.

PROCESS OF OXIDIZING OILS.

SPECIFICATION forming part of Letters Patent No. 672,743, dated April 23, 1901.

Application filed August 25, 1900. Serial No. 28,025. (No specimens.)

*To all whom it may concern:*

Be it known that I, ALEXANDER S. RAMAGE, a resident of Cleveland, in the county of Cuyahoga and State of Ohio, have invented certain new and useful Improvements in Processes of Treating Oils; and I hereby declare the following to be a full, clear, and exact description of the invention, such as will enable others skilled in the art to which it pertains to make and use the same.

My invention relates to an improved process for the production of oils suitable for use in the manufacture of paints and varnishes.

The object of my invention is to convert animal, vegetable, and other non-drying oils into drying-oils which will dry with a hard, glossy, and elastic film.

My invention consists in converting non-drying oils into drying-oils by oxidizing the non-drying oils in the presence of platinum or other oxygen-occluding agent.

The accompanying drawing illustrates apparatus suitable for the carrying out of my process.

In the said drawing, $a$ represents a receptacle or tank for holding the oil to be treated. This receptacle is provided with a drain-pipe $a'$, which is provided with a suitable valve $a^2$.

$b$ represents a steam-jacket incasing the bottom and sides of the receptacle $a$. The steam-jacket is provided with the usual feed and exhaust pipes $b^2$ and $b'$, respectively.

$c$ represents an ozonizer.

$e$ represents a pump for forcing air into the ozonizer.

$d$ represents a coil of pipe provided with perforations $d'$, and $e'$ represents a pipe connecting the coil $d$ with the ozonizer $c$.

In carrying out my process I take the oil which I desire to treat, preferably linseed or menhaden oil, and place it in the tank $a$. Steam is then admitted to the steam-jacket, and the oil is heated to about 200° Fahrenheit, or below the point of decomposition of the oil. I then add to the oil a quantity of platinized asbestos, platinum-black, or other oxygen-occluding substance. I find that ten per cent. platinized asbestos works extremely well; but I do not limit myself to any exact percentage. Air is next admitted to the ozonizer under pressure, and the ozone produced therefrom is forced through the pipe $c'$ into the coil $d$ and is driven through the perforations $d'$ into the oil. After blowing the ozone through the oil four or five hours the character of the oil will be completely changed, the odor of the oil will have been completely destroyed, and the oil will have risen in gravity to about .975. When the operation is completed, the oil is run off and filtered under pressure.

By my process I do not obtain an ordinary oxidized oil, for through extensive experiments I have found that in making varnish with this oil it requires only one-tenth the amount of gum to give the same results as heretofore obtained when using the oils now upon the market. In other words, the oil which I obtain by my process is practically a varnish capable of withstanding weather.

A sample of oil prepared according to my process when placed upon glass or wood dries in about five hours to a firm, hard, glossy, and elastic film. Also the lasting powers of oil thus prepared are very great, and paint made with this oil retains its glossy appearance after long exposure.

In carrying out my process pure oxygen or air may be used instead of ozone in connection with the platinum-black or other oxygen-occluding substance; but this is not practical, as the time necessary to complete the process is thereby lengthened. When using pure oxygen or air, it will require two or three days to accomplish the same results that can be obtained in a few hours by the use of ozone.

I have found that in producing this oil for commercial purposes ten per cent. platinized asbestos gives the best results in proportion to the cost of production. To prepare ten per cent. platinized asbestos, ninety pounds of asbestos fiber is soaked in a solution of seventeen pounds of tetra chlorid of platinum. To this is added fifteen pounds formaldehyde (forty per cent.) and ten pounds caustic soda in solution, and it is allowed to stand about twelve hours. The asbestos fiber is then filtered off and washed until the washings show brown. It is then allowed to stand a few hours, after which it can be freely washed until all the soluble salts are washed out. This washing is very necessary in order to obtain the most active material, as a trace of sodium chlorid lessens the occluding power.

What I claim is—

1. The herein-described process of treating an animal, vegetable or other non-drying oil, so as to produce a drying-oil suitable for use in the manufacture of paints and varnishes, consisting in oxidizing the said oil in the presence of an oxygen-occluding substance.

2. The herein-described process of treating an animal, vegetable or other non-drying oil, so as to produce a drying-oil consisting first in immersing in the body of the oil to be treated an oxygen-occluding substance and then blowing through the oil an oxidizing agent.

3. The herein-described process of treating an animal, vegetable or other non-drying oil, so as to produce a drying-oil, consisting in immersing in the body of oil to be treated an oxygen-occluding substance, then heating the oil and forcing therethrough an oxidizing agent.

4. The herein-described process of treating oil to produce a paint medium consisting in immersing in the oil a quantity of platinum-black and forcing an oxidizing agent through the body of the oil.

5. The herein-described process of treating oil to produce a paint medium consisting in heating the oil in the presence of platinum-black and forcing an oxidizing agent through the oil while heated.

6. The herein-described process of treating oil to produce a paint medium consisting in forcing ozone into the body of oil in the presence of an ozone-occluding agent, such, for instance, as platinum-black.

7. The herein-described process of converting non-drying oils into drying-oils consisting in treating said non-drying oils with ozone in the presence of an ozone-occluding agent, such, for instance, as platinum-black.

8. The herein-described process of converting non-drying oil into a drying-oil consisting in immersing in the body of oil to be treated an ozone-occluding agent, such, for instance, as platinum-black, then forcing a current of ozone into said body of oil.

9. The herein-described process of treating a non-drying oil so as to produce a drying-oil consisting in treating the oil with ozone occluded by platinum.

Signed by me at Cleveland, Ohio, this 2d day of August, 1900.

ALEXANDER S. RAMAGE.

Witnesses:
VICTOR C. LYNCH,
A. H. PARRATT.